US010235719B2

United States Patent
Muessler et al.

(10) Patent No.: US 10,235,719 B2
(45) Date of Patent: Mar. 19, 2019

(54) CENTRALIZED GAAP APPROACH FOR MULTIDIMENSIONAL ACCOUNTING TO REDUCE DATA VOLUME AND DATA RECONCILIATION PROCESSING COSTS

(71) Applicant: SAP SE, Walldorf (DE)

(72) Inventors: Lothar Muessler, Rauenberg (DE); Matthias Schauer, Rauenberg (DE); Frank Raebiger, Bammental (DE)

(73) Assignee: SAP SE, Walldorf (DE)

( * ) Notice: Subject to any disclaimer, the term of this patent is extended or adjusted under 35 U.S.C. 154(b) by 405 days.

(21) Appl. No.: 14/757,977

(22) Filed: Dec. 23, 2015

(65) Prior Publication Data

US 2017/0186095 A1 Jun. 29, 2017

(51) Int. Cl.
*G06Q 40/00* (2012.01)
(52) U.S. Cl.
CPC .................. *G06Q 40/12* (2013.12)
(58) Field of Classification Search
CPC .... G06Q 20/10; G06Q 20/102; G06Q 20/108; G06Q 40/02
USPC ........................ 705/30, 38, 34, 342; 709/203
See application file for complete search history.

(56) References Cited

U.S. PATENT DOCUMENTS

| | | | | | |
|---|---|---|---|---|---|
| 7,822,654 | B2* | 10/2010 | Block | ..................... | G06Q 30/02 705/30 |
| 7,848,969 | B2* | 12/2010 | Murray | ................... | G06Q 30/04 705/30 |
| 2003/0172013 | A1* | 9/2003 | Block | ..................... | G06Q 30/02 705/33 |
| 2005/0038721 | A1* | 2/2005 | Goeckel | ................. | G06Q 10/10 705/30 |
| 2005/0044015 | A1* | 2/2005 | Bracken | ................. | G06Q 20/04 705/30 |
| 2005/0055289 | A1* | 3/2005 | Mehldahl | ............... | G06Q 40/02 705/30 |
| 2007/0078877 | A1* | 4/2007 | Ungar | .................. | G06F 17/2247 |
| 2012/0059746 | A1* | 3/2012 | Thomas | ................. | G06Q 40/02 705/30 |
| 2013/0179313 | A1* | 7/2013 | Basu | ...................... | G06Q 40/10 705/30 |
| 2015/0052068 | A1* | 2/2015 | Wales | .................. | G06Q 30/018 705/317 |
| 2016/0012549 | A1* | 1/2016 | Block | ..................... | G06Q 10/10 705/30 |

* cited by examiner

*Primary Examiner* — Vanel Frenel
(74) *Attorney, Agent, or Firm* — Jones Day (57) ABSTRACT

Systems and methods for a centralized approach to multidimensional accounting are provided. Exemplary embodiments of systems and methods include the creation of GAAP-independent and GAAP-dependent posting documents in an accounting database. The GAAP-independent and GAAP-dependent posting documents may be stored separately in the accounting database, and a given GAAP-independent posting document may be associated with multiple GAAP-dependent posting documents, allowing for significant reductions in data volume and data reconciliation processing costs.

14 Claims, 7 Drawing Sheets

CENTRALIZED GAAP APPROACH FOR MULTIDIMENSIONAL ACCOUNTING TO REDUCE DATA VOLUME AND DATA RECONCILIATION PROCESSING COSTS

FIELD OF THE INVENTION

This disclosure relates to systems and methods for a centralized approach for multidimensional accounting.

BACKGROUND

Financial accounting is a significant aspect of any business operation. Businesses must maintain accounting records of financial transactions, and these records are subject to constantly evolving legal and regulatory requirements. Maintaining accurate accounting records that comply with these requirements is time-consuming and a significant cost driver for businesses. Resources that businesses commit to accounting are generally considered overhead expenses, which detract from the profitability of business operations.

Corporations may incur additional costs in maintaining accounting records across large or diverse operations. The accounting methods needed for these operations may be subject to different legal and regulatory requirements based upon the jurisdictions where the corporation has facilities or where the operations take place. Common sets of accounting practices, principles, standards, and procedures that companies use may be referred to as Generally Accepted Accounting Principles ("GAAP"). For example, the United States employs a financial accounting framework known as "U.S. GAAP." Other jurisdictions may require accounting practices to comply with the International Financial Reporting Standards ("IFRS"). The need to comply with one or more accounting practices increases costs for businesses encountering varying accounting requirements by operating in multiple countries or jurisdictions.

Accordingly, there is a need for business accounting solutions that accurately maintain records of transactions in accordance with the relevant accounting practices. An accounting solution that balances the needs of businesses to efficiently and cost-effectively maintain such records in compliance with legal and regulatory requirements is particularly desired.

SUMMARY OF THE INVENTION

One solution to this need is a technical sub-ledger accounting process solution for a centralized approach to multidimensional accounting using GAAP principles. This solution allows businesses to perform cost-efficient accounting across a variety of jurisdictions and in compliance with all required accounting practices.

Embodiments of the present invention provide systems and methods for a centralized approach to multidimensional accounting. Exemplary embodiments of systems and methods include the creation of GAAP-independent and GAAP-dependent posting documents in an accounting database. The GAAP-independent and GAAP-dependent posting documents may be stored separately in the accounting database, and a given GAAP-independent posting document may be associated with multiple GAAP-dependent posting documents, allowing for significant reductions in data volume and data reconciliation costs.

Embodiments of the present invention will be described in detail in the exemplary embodiments presented in the drawings and disclosure set forth below.

DETAILED DESCRIPTION

Exemplary embodiments of the present invention provide system and method for a centralized approach for multidimensional accounting using GAAP.

A business may record the numerical value or other information relating to a business transaction in a posting document. Posting documents resulting from business transactions generally constitute a large proportion of posting documents. Since operational posting documents are based on a business transaction, these posting documents may be independent of GAAP or other accounting standards.

Analytical posting documents may be documents resulting from legal or regulatory requirements, and constitute a second category of document postings. Analytical document postings may be dependent upon a given accounting procedure, such as U.S. GAAP or IFRS. Local laws or regulations may require a business to apply various accounting procedures.

One feature of the present invention is the separation of operational, i.e., GAAP-independent, document postings, from analytical, i.e., GAAP-dependent, document postings. The GAAP-independent document postings may be made into a "central GAAP" accounting framework, which is independent of any particular set of accounting practices. In contrast, GAAP-dependent document postings may be made into one or more "delta GAAP" frameworks, which are dependent upon particular accounting practices, such as U.S. GAAP or IFRS.

Both operational and analytical posting documents must be reflected in an accounting sub-ledger. Given the large number of postings generated, a single sub-ledger may incur data volume management challenges. The present invention addresses data volume management challenges by reducing the data volume while storing all relevant accounting information.

Data reconciliation, in which the completeness and correctness of posting documents is assessed and discrepancies between postings are identified, also poses a challenge. In particular, where compliance with multiple accounting procedures is required, data reconciliation challenges increase. The present invention responds to the challenge by reducing the need for reconciliation between accounting systems, regardless of location or the applicable accounting practices.

As used herein, the term "multidimensional accounting" is a flexible way of structuring accounting data and processes. A multidimensional accounting solution allows for a user to operate on accounting dimensions stored separately as coding blocks. A multidimensional accounting coding block contains all data fields necessary to identify or categorize the document posting. It will be appreciated that the data fields may vary based on the underlying transaction and the relevant information for this transaction.

Conventional accounting employs predefined accounting assignments including several coding block dimensions, and combines several dimensions into one account. In contrast, multidimensional accounting holds all dimensions separated and the account reflects only the dimension relevant for financial accounting and classifications including, for example, book value components, unpaid principal balance, and accruals. In this way, multidimensional accounting may reduce the number of accounts, whereas conventional accounting solutions must manage multiple accounts depending upon the number and characteristic values of all of the relevant dimensions.

An example of the systems and methods used for the accounting of financial instruments is U.S. Patent Application Publication No. 2014/02580853, the entirety of which is incorporated herein by reference. This publication describes accounting methods for receiving financial instrument data and classifying the financial instrument data into position components.

Figure 1:
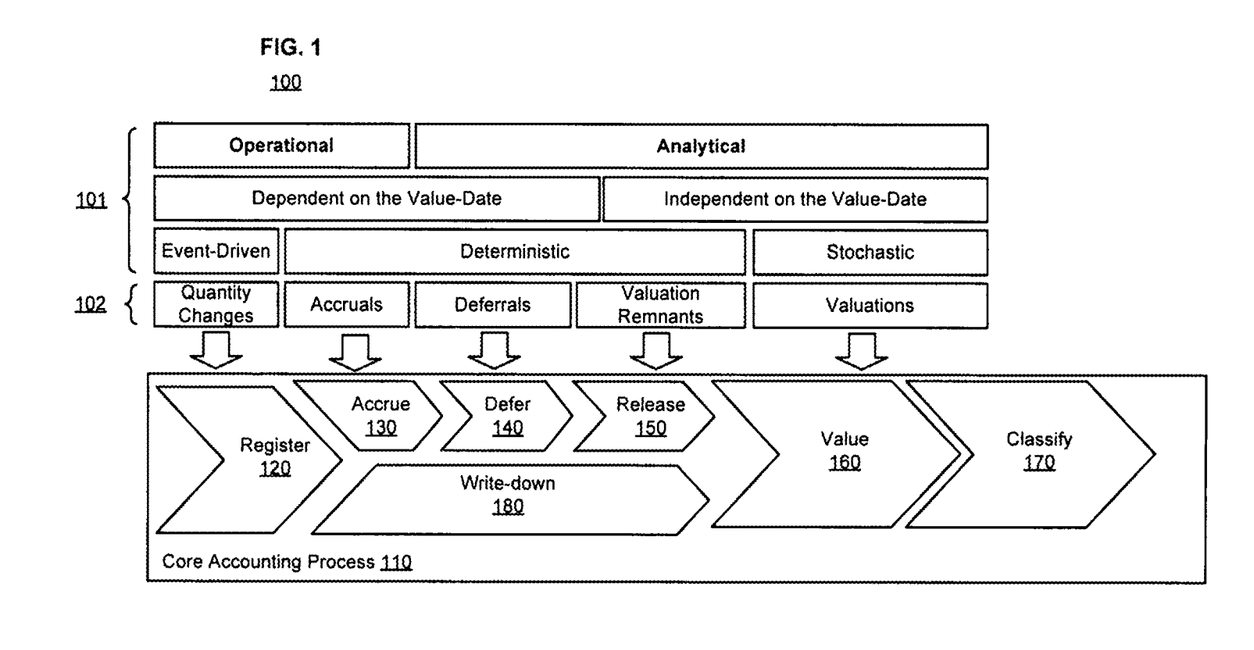
FIG. 1 is a diagram of an accounting process that may be used with generic distinctions of position components according to an exemplary embodiment.

FIG. 1 is a diagram of an accounting process 100 that may be associated with the generic distinctions 101 according to an embodiment of the present disclosure. The first distinction may determine whether the position component is operational or analytical. In the first distinction, a position component may be defined as operational if the position component is either managed or controlled by a product system. For example, the product system for a mortgage loan is in charge of processing the loan contracts. This may involve keeping track of due dates and processing customer payments. In the case of an exchange-traded security, the product system may be the trading system. Book value components that are operational may be used for reconciliations. Book value components that are operational may be required to have the same balance in all accounting regulations. A position component may be defined as analytical if it reflects the value-adding tasks of accounting. Book value components that are analytical may generally depend on the type of accounting regulation.

The second distinction may determine whether the position component is dependent on or independent of a value-date. The value-date is the date that an entry to a financial account is legally effective or when a transaction is settled. In addition, the value-date is used for the periodic allocation of interest payments, charges and discounts. While other dates, such as the posting date, are relevant for all position components, the value-date may not be a relevant characteristic for all of the position components.

The third distinction may determine whether the position component is event-driven, deterministic or stochastic. These distinctions may determine what drives the dynamics or time dependence of the position components. Position components that are event-driven may change in response to real world events. Position components that are deterministic may change based on predefined time dependence. Position components that are stochastic may change erratically due to, for example, the existence of fluctuating risk factors.

Position components 102 may be used in the steps of the accounting method 110. The position components 102 may include quantity changes, accruals, deferrals, valuation remnants, and valuations (e.g., credit risk, hedged risk and/or other risks). Each of the position components 102 may correspond to a particular combination of the predetermined distinctions 101.

As shown in FIG. 1, each of the position components 102 may be associated with a step of the accounting method 110. The method 110 may include registering 120, accruing 130, deferring 140, releasing 150, valuing 160, classifying 170, and writing down 180. Each of the position components 102 may be processed by the respective steps 120-160 and 180 of the accounting method. The accounting method 110 allows for the position components 102 to be constantly updated. The steps of the accounting method 110 may use data associated with the financial instrument to perform the steps. The data can be classified into the position components 102 based on the generic distinctions.

The registering step 120 may be associated with the quantity changes position component. The registering 120 may receive operational information associated with the financial position and calculate or record the quantity changes. The registering 120 may be performed before the other steps to keep the accounting application simple and tractable. The registering step 120 may include processing the business transactions, processing master data changes (e.g., contractual changes) and/or processing credit events. The business transaction may be a customer payment or information on a contractually due payment, a so-called settlement business transaction. Master data changes may include a contractual change (e.g., a restructuring of the contractual payments) or a change in business partner attributes (e.g., a change of the place of residence from "domestic" to "foreign"). Credit events may include an indicator of financial distress (such as a deterioration of the credit rating or the fact that a certain critical dunning level has been reached).

Accruing 130 may be associated with the accruals position component (e.g., interest accruals). The accruing 130 may include calculating the interest accruals associated with the financial position. The deferring 140 may be associated with the deferrals position component. The deferring 140 may include calculating the discount deferral or the periodic charges associated with the financial position. Because the accruals and deferrals position components are dependent on the value-date the accruing 130 and deferring 140 may be performed based on the value-date. The accruing 130 and deferring 140 may be performed after all of the other operational position components are processed.

Releasing 150 may be associated with the valuation remnants position components. The valuation remnants may include hedge adjustment remnant and/or fair value adjustment remnant. The releasing 150 may include releasing valuation remnants to the profit and loss or corresponding reserves.

Valuing 160 may be associated with the valuations position components. The valuing 160 may include determining the value of financial positions and/or processing changes in the valuation methodology. Determining the value of financial positions may include calculating one or more of the credit risk, hedge risk and other risks. These risks may provide for the impairment of the financial position, hedge adjustment of the financial position and/or adjustment to the fair value of the financial position.

Classifying 170 may include determining the relevant disclosure of a position in the financial statements. Classifying 170 may include representing (e.g., as shown in FIG. 2 or in a spreadsheet) the information created in the one or more preceding steps 120-160 or by writing down 180.

Writing down 180 may correspond to the write-down position components. The generic distinctions of the write down component may include analytical, value-date independent and event-driven distinctions.

Additional disclosure regarding the elements of FIG. 1 is contained in the above-referenced and incorporated publication.

Figure 2:
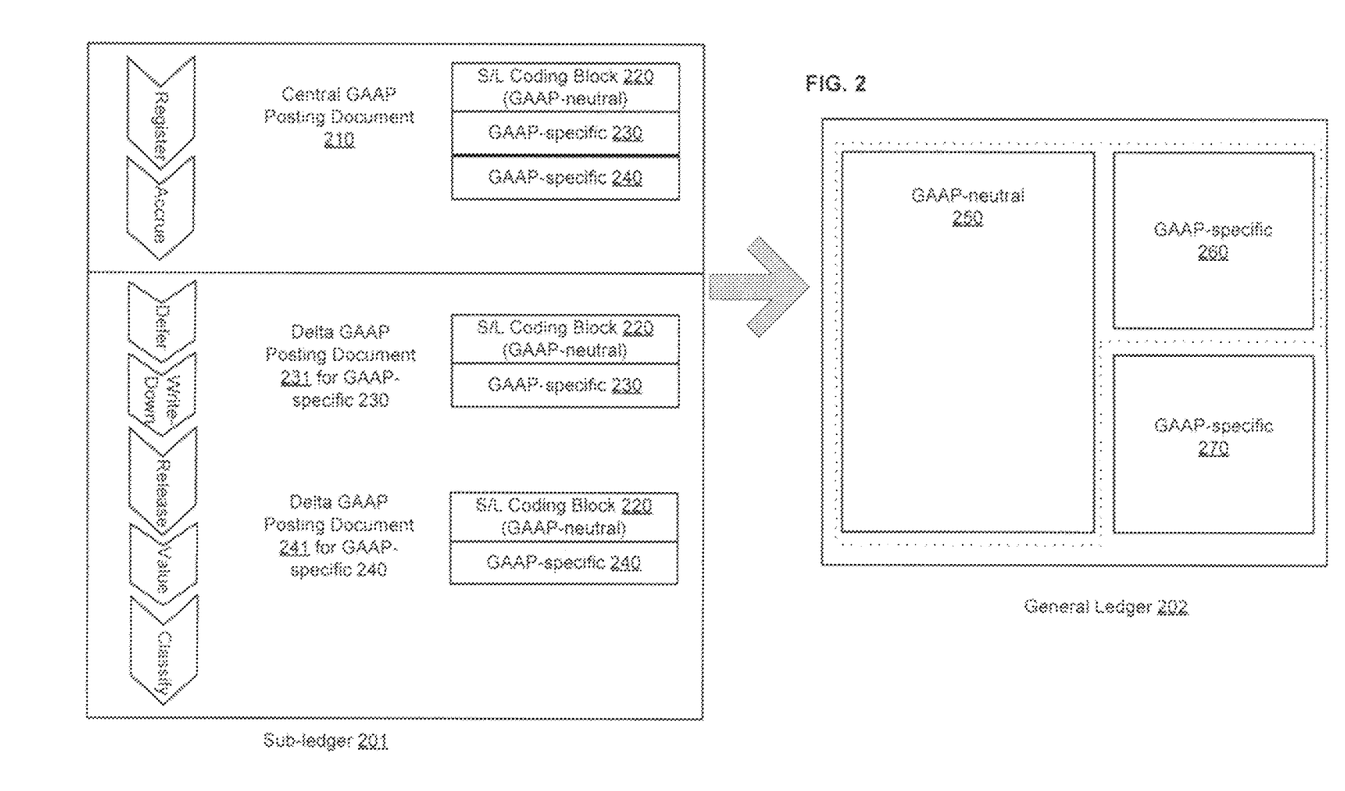
FIG. 2 is a diagram of a sub-ledger and general ledger according to an exemplary embodiment.

FIG. 2 is a block diagram of a sub-ledger 201 and general ledger 202 according to an embodiment of the present disclosure. The sub-ledger 201 includes a central GAAP posting document 210, which comprises a GAAP-neutral sub-ledger coding block 220 that is independent of any accounting framework. The coding block 220 contains all data fields necessary to identify or categorize the document posting. The central GAAP coding block 220 is associated with GAAP-specific coding blocks 230 and 240, which are dependent upon specific accounting frameworks. Coding blocks 230 and 240 reflect specific GAAP accounting frameworks, such as U.S. GAAP or IFRS, for example. It will be appreciated that the present invention is applicable to any accounting framework.

The sub-ledger 201 further includes a delta GAAP posting documents 231 and 241, which are the GAAP-specific postings for the GAAP-specific coding blocks 230 and 240, respectively. The delta GAAP posting documents 231 and 241 reflect the local accounting frameworks as necessary.

The sub-ledger 201 may be integrated into the general ledger 202. As shown in FIG. 2, the general ledger may include GAAP-neutral posting documents 250 (i.e., operational or GAAP-independent processes and posting documents) and one or more GAAP-specific posting documents (i.e., analytical or GAAP-dependent processes and posting documents), illustrated as GAAP-specific posting documents 260 and 270. As shown in FIG. 2, the GAAP-neutral posting documents 250 are separated from the GAAP-specific posting documents 260, 270. Each of the GAAP-specific posting documents 260, 270 relates to a particular accounting practice. For example, GAAP-specific posting documents 260 may relate to U.S. GAAP practices, and GAAP-specific posting documents 270 may relate to IFRS accounting practices. In the general ledger 202, a complete GAAP accounting contains both the GAAP-neutral posting documents 250 and at least one of the GAAP-specific posting documents 260, 270. The dotted line in FIG. 2 encompassing both GAAP neutral posting documents 250 and GAAP-specific posting documents 260 is an example of a complete GAAP in the central GAAP accounting approach according to embodiments of the present invention.

Additional disclosure regarding general ledger accounting solutions and the integration of a sub-ledger into a general ledger is provided with reference to FIG. 4, below.

Exemplary embodiments of the creation of central and delta GAAP postings will now be discussed. As shown in FIGS. 1 and 2, the accounting process is composed of a series of steps, and these steps may be categorized according to the distinctions 101 and position components 102 described above. The documentation of a process step in central GAAP or delta GAAP is based on these categorizations.

Table 1 below illustrates examples of exemplary accounting process steps and sets forth whether the resulting postings are made to the central GAAP or delta GAAP.

TABLE 1

| Process Step | Description | Dimensions | Posting |
| --- | --- | --- | --- |
| Register | Documentation of business transaction | Operational Dependent on value date Event-driven | Central GAAP |
| Accrue | Documentation of accruals or interest or fees | Operational Dependent on value date Deterministic | Central GAAP |
| Defer | Documentation of deferrals on discount or premium | Analytical Dependent on value date Deterministic | Delta GAAP |
| Write-Down | Documentation of notional write-down | Analytical Independent from value date Event-driven | Delta GAAP |
| Release | Documentation of deferrals on valuation remnants | Analytical Independent from value date Deterministic | Delta GAAP |
| Value | Documentation of risk provision, hedge adjustment, fair value adjustment, or lower cost of market adjustment | Analytical Independent from value date Stochastic | Delta GAAP |
| Classify | Documentation of reclassifications | Analytical Independent from value date Event-driven | Delta GAAP |

The registering process step may reflect the documentation of a business transaction. This process step may be viewed as operational, dependent on value-date, and event-driven. In view of these dimensions, the registering process step creates posting documents that are GAAP-independent, and accordingly these postings are made to the central GAAP.

The accrue process step may reflect the documentation of accruals for interests or fees. This process step may be viewed as operational, dependent on value date, and event-driven. In view of these dimensions, the accrue process step creates posting documents that are GAAP-independent, and accordingly these postings are made to the central GAAP.

The defer process step may reflect the documentation of deferrals on a discount or premium. This process step may be viewed as analytical, dependent on value date, and deterministic. In view of these dimensions, the defer process step creates posting documents that are GAAP-dependent, and accordingly these postings are made to the delta GAAP.

The write-down process step may reflect the documentation of notional write-downs. This process step may be viewed as analytical, independent from value date, and event-driven. In view of these dimensions, the write-down process step creates posting documents that are GAAP-dependent, and accordingly these postings are made to the delta GAAP.

The release process step may reflect the documentation of deferrals on valuation remnants. This process step may be viewed as analytical, independent from value date, and deterministic. In view of these dimensions, the release process step creates posting documents that are GAAP-dependent, and accordingly these postings are made to the delta GAAP.

The value process step may reflect the documentation of risk provisions, hedge adjustments, fair value adjustments, or lower cost of market adjustments. This process step may be viewed as analytical, independent from value date, and stochastic. In view of these dimensions, the value process step creates posting documents that are GAAP-dependent, and accordingly these postings are made to the delta GAAP.

The classify process step may reflect the documentation of reclassifications. This process step may be viewed as analytical, independent from value date, and event-driven. In view of these dimensions, the release process step creates posting documents that are GAAP-dependent, and accordingly these postings are made to the delta GAAP.

Figure 3A:
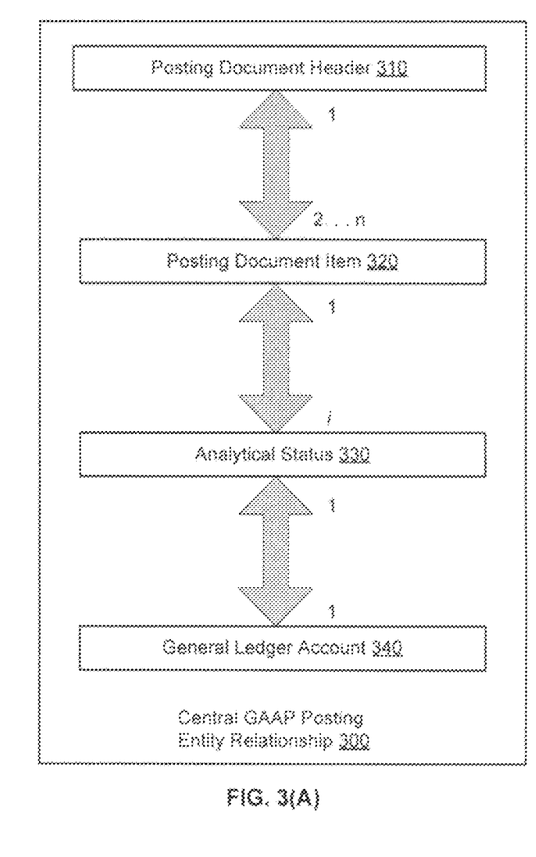
FIG. 3(A) is an entity relational model for a central GAAP posting according to an exemplary embodiment.

The differences between GAAP-independent and GAAP-dependent posting documents will now be discussed, with reference to the entity relationship models presented in FIGS. 3(A) and 3(B) according to embodiments of the present disclosure.

A GAAP-independent posting document, i.e., a central GAAP posting, may include coding block dimensions and currency amounts that are identical for all accounting practices. That is, only the document's analytical status (e.g., holding category, asset/liability status, impairment status, accruing status, hedge status, market conformity status) and the general ledger account may differ between accounting practices.

A GAAP-independent posting document may be stored only once for all accounting practices. As shown in the central GAAP posting entity relationship 300 in FIG. 3(A), the GAAP-independent posting may include a posting document header 310 that is stored only once for all accounting practices. The GAAP-independent posting may include from 2 to n posting document items 320, where n is the number of line items necessary to store the relevant information for the posting document or the underlying business transaction.

A GAAP-independent document's analytical statuses, however, may be stored on a per-item basis and may be stored once for each relevant accounting practice. As shown in FIG. 3(A), the GAAP-independent posting includes analytical status 330, which is stored i times, where i is the number of accounting practices, per document item 320.

The GAAP-independent posting further includes a general ledger account 340, which is stored only once for all accounting practices.

A GAAP-dependent posting document, i.e., a delta GAAP posting, may include currency amounts in posting documents that vary based on different accounting practices. These processes may be considered analytical, and accordingly result in delta GAAP posting documents. That is, one document header, two or more posting document items, and one analytical status per item is created for each accounting practice.

Figure 3B:
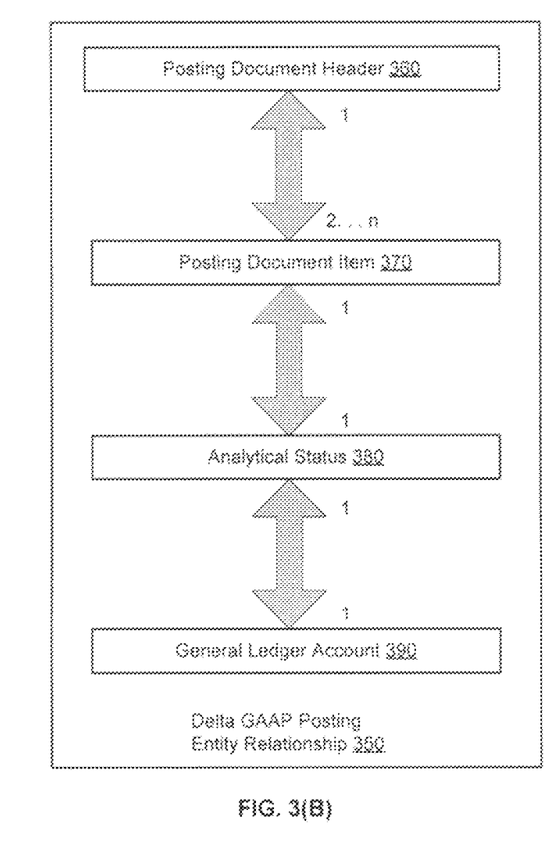
FIG. 3(B) is an entity relational model for a delta GAAP posting according to an exemplary embodiment.

As shown in the delta GAAP posting entity relationship 350 in FIG. 3(B), the GAAP-dependent posting may include one posting document header 360 that is stored once. The GAAP-dependent posting may include from 2 to n posting document items 320, where n is the number of line items necessary to store the relevant information for the posting document or the underlying business transaction.

In contrast to a GAAP-independent posting, the GAAP-dependent posting may include only one analytical status 380 per document item 370. This is because the analytical status 380 in a GAAP-dependent posting is specific to a particular accounting practice. The GAAP-dependent posting further includes a general ledger account 390, which is stored only once.

Embodiments of the present invention include multidimensional accounting solutions, and may be applied as a sub-ledger solution, for example, with the SAP® Accounting for Financial Instruments product. However, it will be appreciated that the present invention is not limited thereto, and is also operable with general ledger accounting solutions, such as, for example, the SAP® New General Ledger.

General ledger accounting solutions may employ general ledger accounts, which may comprise several coding block dimensions that depend on the general ledger account definitions. A sub-ledger accounting solution may provide a general ledger accounting solution with posting documents at a general ledger coding block level. The general solution may concatenate several coding block dimensions into one general ledger accounting solution.

Figure 4:
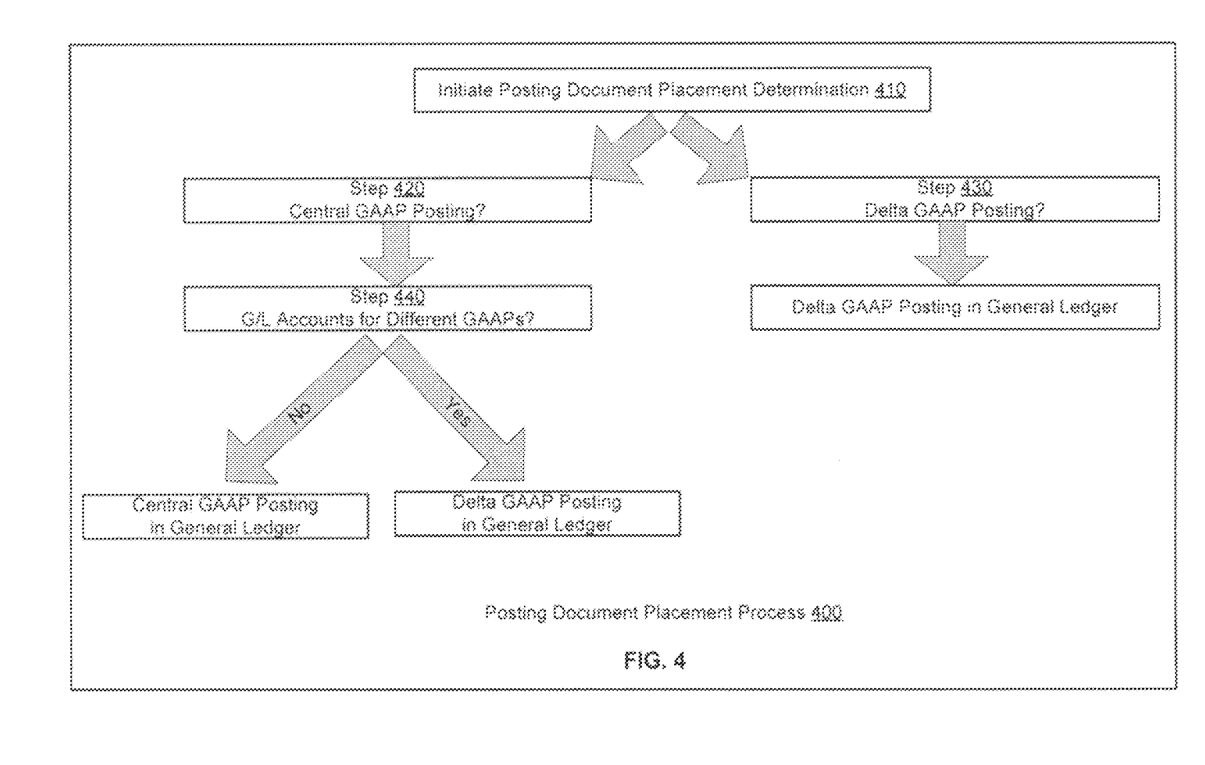
FIG. 4 is a diagram illustrating a posting document placement process according to an exemplary embodiment.

FIG. 4 is a process diagram illustrating a posting document placement process 400 for the integration of a sub-ledger posting document into a general ledger solution according to an embodiment of the present invention.

As shown in FIG. 4, the placement document process is initiated at step 410, by determining where the posting document is located in the sub-ledger. The posting document may be identified as a central GAAP posting in the sub-ledger at step 420. If step 420 is reached, a subsequent step, step 440, may determine if the general ledger accounts are different for different accounting practices. If the general ledger accounts do not differ based on different accounting practices, the document may become a central GAAP posting on the general ledger.

The posting document may be identified as a delta GAAP posting in the general ledger at step 430, however. In this case, the document may become a delta GAAP posting on the general ledger.

Figure 5:
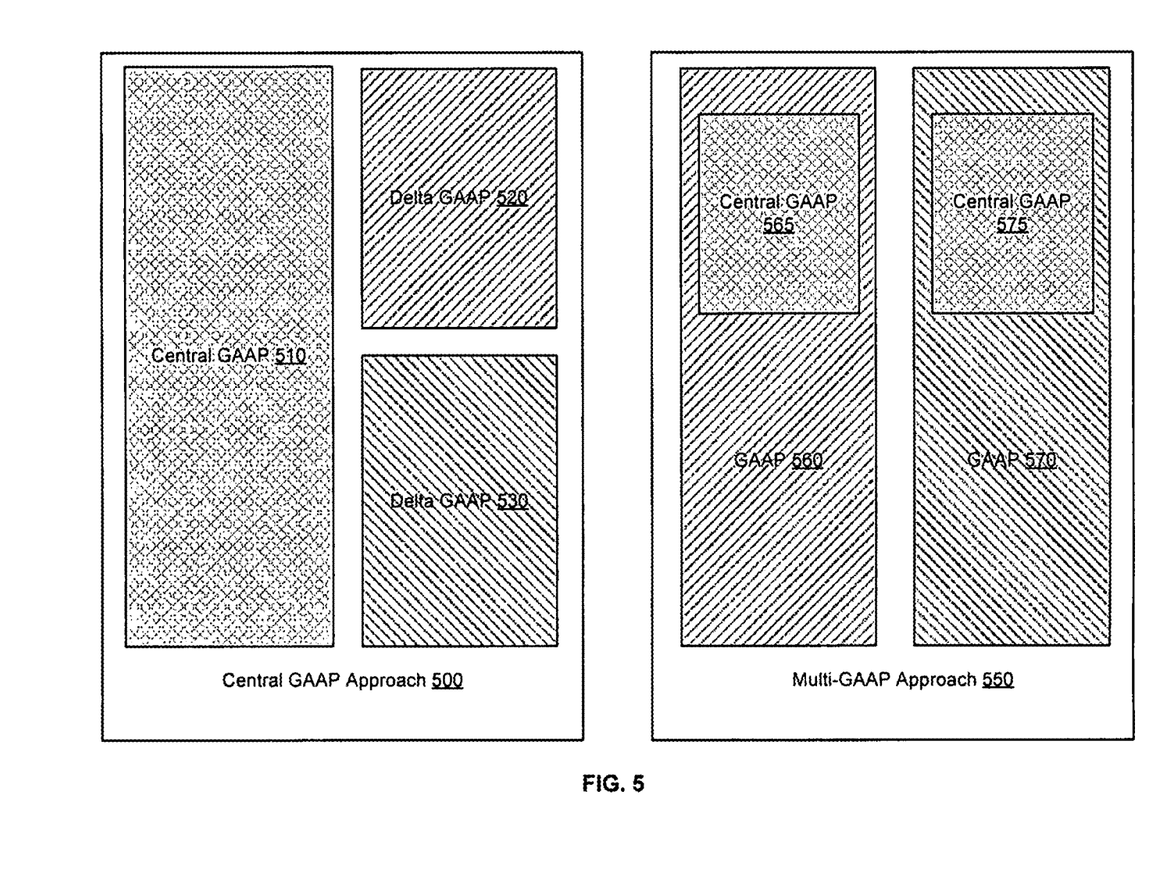
FIG. 5 is a diagram illustrating a central GAAP approach for multidimensional accounting according to an exemplary embodiment and a multi-GAAP accounting approach.

A comparison between centralized GAAP approach for multidimensional accounting according to the present invention and a multi-GAAP approach is illustrated in FIG. 5.

In a central GAAP approach, operational posting documents are separated from the analytical documents. As shown in FIG. 5, the central GAAP approach 500 includes operational posting documents contained in central GAAP 510. The central GAAP approach 500 further includes one or more analytical posting documents, shown as Delta GAAP 520. Thus, the operational, i.e., GAAP-independent, posting documents are technically separated from the analytical, i.e., GAAP-dependent, posting documents. The central GAAP posting documents 510 may be represented by multiple analytical (GAAP-dependent) delta GAAP posting documents 520, 530 under as many accounting practices as required. For example, the delta GAAP 520 may conform with U.S. GAAP accounting practice, and the delta GAAP 530 may conform with IFRS accounting practice.

In contrast, the multi-GAAP approach 550 for this exemplary data includes two complete representations of the posting documents, shown as GAAP 560 and 570. For example, the GAAP 560 may conform with U.S. GAAP accounting practice, and the GAAP 570 may conform with IFRS accounting practice. The operational posting documents, shown as central GAAP 565 and 575, are redundantly included in GAAP 560 and 570, respectively, along with the required analytical posting documents for each required accounting practice. Thus, under the multi-GAAP approach, complete representations of all posting documents are required for each required accounting practice.

By separating the central GAAP 510 posting documents (i.e., the GAAP-independent, operational posting documents) from the delta GAAP 520, 530 posting documents (i.e., the GAAP-dependent, analytical posting documents) the volume of posting documents that must be stored is greatly reduced in comparison to the multi-GAAP approach 550, which redundantly stores operational documents. In many accounting systems, the number of operational posting documents is significantly greater than analytical posting documents, which increases this beneficial effect. Accordingly, a central GAAP approach for multidimensional accounting according to embodiments of the present invention significantly reduces data volume.

Another benefit of the present invention is a reduction in reconciliation effort. By centrally managing the operational posting documents, the need for data reconciliation is greatly reduced. According to embodiments of the present invention, data reconciliation is only necessary between different business operational systems, e.g., a bank loan management system and a bank deposition system, and the account solution. Data reconciliation between different accounting practices within the accounting solution according to embodiments of the present invention is not necessary. Further, data reconciliation decisions may be based on the operational or analytical dimensions.

Thus, the central GAAP approach according to embodiments of the present invention is based on multidimensional accounting and offers significantly higher potential for data volume reduction and significantly reduced data reconciliation needs when compared to conventional accounting solutions.

Figure 6:
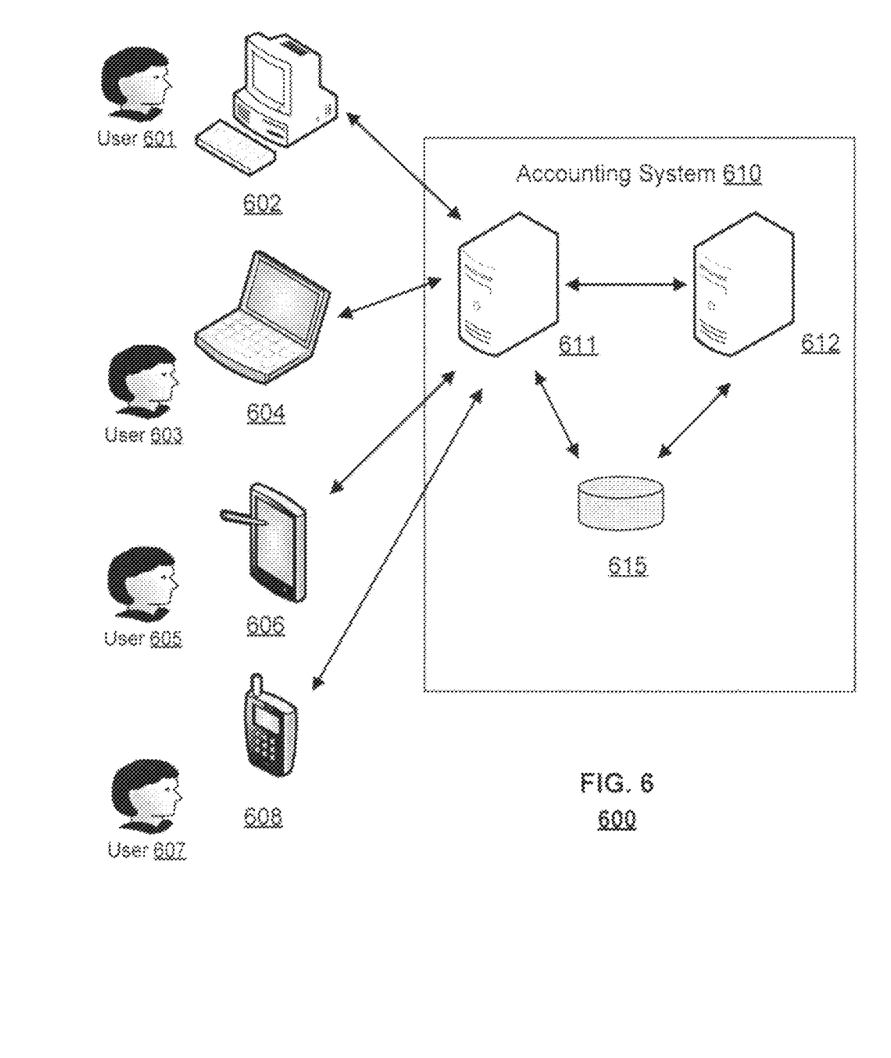
FIG. 6 is a diagram illustrating an accounting system supporting a central GAAP approach for multidimensional accounting according to an exemplary embodiment.

FIG. 6 illustrates a computer system 600 implementing a central GAAP approach to multidimensional accounting according to embodiments of the present invention. In the embodiment of FIG. 6, users 601, 603, 605, 607 access an accounting system 610 using one or more client devices 602, 604, 606, 608. The client devices may be a desktop computer, a laptop computer, a tablet computer, a smartphone, a server, a personal digital assistant, a palmtop computer, or other portable computing device, or any combination of these devices. If multiple client devices are employed, a data communication between the devices can be implemented using wired, wireless, or network connections.

The computer system 600 further includes the accounting system 610. The accounting system 610 may including one or more application servers 611, 612 that support an accounting database server 615. The accounting database server 615 may host one or more accounting databases. One or more scheduling managers may be included in the application servers 611, 612 or the accounting database server 615. The scheduling manager may initiate, manage, and terminate the accounting processes and document posting processes. The scheduling manager may be assigned responsibility for all data processing functions, including generating document postings and related data items discussed herein, as well as frequencying the data with a given period.

The client devices 602, 604, 606, 608 may create data connections with the application servers 611, 612 using wired, wireless, or network connections. Through these connections, the users can interact with the accounting system 610, and may, for example, create or view posting documents, query the accounting database server 615, analyze the received data, or execute any other functionality of the accounting system.

It will be appreciated that the accounting system 610 may be deployed across any platform accessible by the client devices, such as a closed or local network, an internet-centric network, a cloud platform, and may utilize desktop databases and mobile databases, as well as in-memory databases across these platforms. For example, SAP® HANA is a widely popular in-memory computing platform that combines application processing, database, and integration processing into a single platform, and is an example of a platform that may support an accounting system in accordance with the present invention. These platforms may be supported by one or more application servers and accounting database servers, and are not limited by the embodiments illustrated in FIG. 6.

Embodiments of the present invention may be readily incorporated into other accounting solutions, including the SAP® Accounting for Financial Instruments product, which is an intrinsic business process model that can be applied to all accounting systems worldwide. Another example is the SAP® Bank Analyzer product, which supports the calculation, evaluation, and analysis of financial products. Further, the present invention is also operable with general ledger accounting solutions, such as, for example, the SAP® New General Ledger. as previously noted.

While embodiments of the present invention have been described in relation to generic GAAP accounting practices, as well as the U.S. GAAP and IFRS, it will be appreciated that the features of the present invention are applicable to any accounting practices, principles, standards, and procedures. Similarly, the features of the present invention may be applied to any database platform and programming, instructions, processes, and logic. Software in accordance with this invention may employ classes as used in object-oriented programming, but the invention is applicable to all application and database programming implementations.

It will be further appreciated that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principles disclosed and claimed herein.

What is claimed is:

1. A computer-implemented central GAAP method for multidimensional accounting to reduce data storage requirements for accounting documents according to differing accounting standards, the method being implemented by one or more data processors forming part of at least one computer and comprising:

receiving information related to a business transaction, the business transaction comprising a plurality of interrelated accounting processes;

creating an operational posting document characterizing a first subset of the accounting processes and at least two analytical posting documents collectively characterizing accounting processes other than the first subset of the accounting processes based on the received information in an accounting database; and storing the operational posting document as a GAAP-independent posting document and the at least two analytical posting documents as at least two GAAP-dependent posting documents, each of the at least two analytical posting documents being associated with different accounting standards;

wherein:

the operational posting document comprises (i) a GAAP-neutral coding block having all fields necessary to identify or characterize the GAAP-independent posting document and (ii) at least two specific GAAP-specific coding blocks each corresponding to a respective one of the at least two analytical posting documents as well as different accounting frameworks;

each analytical document comprises (a) a GAAP-neutral coding block having all fields necessary to identify or characterize the corresponding GAAP-dependent posting document and (b) a GAAP-specific coding block corresponding to an associated accounting framework for such GAAP-dependent posting document;

a storage requirement for the operational posting document and the analytical documents is reduced as compared to a multi-GAAP storage scheme.

2. The computer-implemented central GAAP method for multidimensional accounting of claim 1, wherein the GAAP-independent posting document is stored separately from the at least two GAAP-dependent posting documents.

3. The computer-implemented central GAAP method for multidimensional accounting of claim 1, wherein the GAAP-independent posting document and the at least two GAAP-dependent posting documents are stored in a sub-ledger.

4. The computer-implemented central GAAP method for multidimensional accounting of claim 3, wherein the sub-ledger storing the GAAP-independent posting document and the at least two GAAP-dependent posting documents is integrated into a general ledger.

5. The computer-implemented central GAAP method for multidimensional accounting of claim 1, wherein the at least one GAAP-dependent posting document conforms with U.S. GAAP accounting practices.

6. The computer-implemented central GAAP method for multidimensional accounting of claim 1, further comprising:
creating, for the GAAP-independent posting document:
a posting document header;
a plurality of posting document items, wherein the posting document items store information relating to a business transaction;
at least one analytical status, wherein each of the at least one analytical status relate to an accounting practice; and
a general ledger account.

7. The computer-implemented central GAAP method for multidimensional accounting of claim 1, further comprising:
creating, for each GAAP-dependent posting document:
a posting document header;
a plurality of posting document items, wherein the posting document items store information relating to a business transaction;
a plurality of analytical statuses,
wherein each of the plurality of analytical statuses relate to an accounting practice, and
wherein the number of analytical statuses included in the plurality of analytical statuses is equal to the number of posting document items included in the plurality of posting document items; and
a general ledger account.

8. A computer system for reducing storage requirements for accounting documents across a plurality of different accounting standards, the system comprising:
at least one client device in communication with an application server, the application server implementing a central GAAP approach to multidimensional accounting;
a database server hosting an accounting database;
a GAAP-independent posting document and a GAAP-dependent posting document,
wherein the accounting database stores the GAAP-independent posting document separately from the GAAP-dependent posting document,
wherein the GAAP-independent posting document includes:
a first posting document header;
a first plurality of posting document items, wherein the posting document items store information relating to a first portion of a business transaction;
at least one first analytical status, wherein each of the at least one first analytical status relates to an accounting practice; and
a first general ledger account; and
wherein the GAAP-dependent posting document includes:
a second posting document header;
a second plurality of posting document items, wherein the second posting document items store information relating to a second, different portion of the business transaction;
a plurality of second analytical statuses,
wherein each of the plurality of second analytical statuses relate to different accounting practices,
wherein the number of second analytical statuses included in the plurality of second analytical statuses is equal to the number of second posting document items included in the plurality of second posting document items; and
a second general ledger account.

9. A system to reduce data storage requirements for accounting documents according to differing accounting standards, the system comprising:
at least one data processor; and
memory storing instructions, which when executed by the at least one data processor, result in operations comprising:
receiving information related to a business transaction, the business transaction comprising a plurality of interrelated accounting processes;
creating an operational posting document characterizing a first subset of the accounting processes and at least two analytical posting documents collectively characterizing accounting processes other than the first subset of the accounting processes based on the received information in an accounting database; and
storing the operational posting document as a GAAP-independent posting document and the least two analytical posting documents as at least two GAAP-dependent posting documents;
wherein:
the operational posting document comprises (i) a GAAP-neutral coding block having all fields necessary to identify or characterize the GAAP-independent posting document and (ii) at least two specific GAAP-specific coding blocks each corresponding to a respective one of the at least two analytical posting documents as well as different accounting frameworks;
each analytical document comprises (a) a GAAP-neutral coding block having all fields necessary to identify or characterize the corresponding GAAP-dependent posting document and (b) a GAAP-specific coding block corresponding to an associated accounting framework for such GAAP-dependent posting document.

10. The system of claim 9, wherein the GAAP-independent posting document is stored separately from the at least two GAAP-dependent posting documents.

11. The system of claim 9, wherein the GAAP-independent posting document and the at least two GAAP-dependent posting documents are stored in a sub-ledger.

12. The system of claim 11, wherein the sub-ledger storing the GAAP-independent posting document and the at least two GAAP-dependent posting documents is integrated into a general ledger.

13. The system of claim 9, wherein one of the at least two GAAP-dependent posting documents conform with U.S. GAAP accounting practices.

14. The system of claim 9, wherein the operations further comprise:
- creating, for the GAAP-independent posting document:
  - a posting document header;
  - a plurality of posting document items, wherein the posting document items store information relating to a business transaction;
  - at least one analytical status, wherein each of the at least one analytical status relate to an accounting practice; and
  - a general ledger account.

* * * * *